United States Patent
Boscoli

(10) Patent No.: US 6,654,433 B1
(45) Date of Patent: Nov. 25, 2003

(54) METHOD AND MACHINE FOR PRODUCING ENERGY BY NUCLEAR FUSION REACTIONS

(75) Inventor: Renzo Boscoli, Palata Pepoli (IT)

(73) Assignee: David Anthony Cappelletti, Elkhart, IN (US)

( * ) Notice: Subject to any disclaimer, the term of this patent is extended or adjusted under 35 U.S.C. 154(b) by 0 days.

(21) Appl. No.: 09/381,353
(22) PCT Filed: Mar. 19, 1998
(86) PCT No.: PCT/IB98/00388
§ 371 (c)(1), (2), (4) Date: Jan. 3, 2000
(87) PCT Pub. No.: WO98/43249
PCT Pub. Date: Oct. 1, 1998

(30) Foreign Application Priority Data

Mar. 20, 1997 (IT) .................................. BO97A0169

(51) Int. Cl.⁷ ................................................. G21G 4/00
(52) U.S. Cl. ..................... 376/108; 376/151; 376/100
(58) Field of Search ................................ 376/108, 109, 376/113, 127, 151, 100

(56) References Cited

U.S. PATENT DOCUMENTS 3,329,848 A * 7/1967 Adache et al. ............... 376/108
3,546,512 A * 12/1970 Frentrop ....................... 376/108
4,283,631 A * 8/1981 Turner .......................... 376/108

FOREIGN PATENT DOCUMENTS

EP 0 338 619 A1 4/1989
JP 02298891 11/1990

OTHER PUBLICATIONS

XP–002052288 F.M. Bacon, et al., Intense Neutron Source Development for Use in Cancer Therapy, IEEE Transactions on Nuclear Science, vol. NS–28, No. 2, Apr. 1981, pp. 1902–1905.
XP–002052289 Akira Kitamura et al., In Situ Elastic Recoil Detection Analysis of Hydrogen Isotopes During Deuterium Implantation into Metals, Fusion Technology, vol. 29, May 1996, pp. 372–378.
XP–002052290 S.P. Moo et al., An Investigation of the Ion Beam of a Plasma Focus Using a Metal Obstacle and Deuterated Target, IEEE Transactions on Plasma Science, vol. 19, No. 3, Jun. 1991, pp. 515–519.
921B1/00 M. Fallavier, et al., Search for Nuclear Fusion in Deuterated Targets Under Cluster–Beam Impact, Physical Review Letters 65(1990) Jul. 30, No. 5.

* cited by examiner

Primary Examiner—Michael J. Carone
Assistant Examiner—Daniel Matz

(57) ABSTRACT

An experimental machine (1) for producing low-temperature nuclear fusion reactions, wherein an ion source (3) feeds a flux of positive deuterium ions to a reaction chamber (2) housing a target (5) defined by active elements (30, 31) and by an aggregate of metal sulfate hydrated with heavy water; a pumping assembly (4) being provided to maintain a vacuum in the reaction chamber (2); and the reaction chamber (2) having an accelerating device (10) for accelerating the positive deuterium ions, and which generates an electric field inside the reaction chamber (2) to convey and accelerate the deuterium ions against the active element of the target (5) in such a manner as to initiate nuclear fusion reactions between the incident deuterium ions and some of the atoms of the active element.

11 Claims, 3 Drawing Sheets

METHOD AND MACHINE FOR PRODUCING ENERGY BY NUCLEAR FUSION REACTIONS

TECHNICAL FIELD

The present invention relates to a method of producing energy by nuclear fusion reactions.

BACKGROUND ART

The general consensus in most scientific circles is that neutron emission in itself is incontrovertible proof of the nuclear fusion of two deuterium atoms, or of one deuterium and one tritium atom.

DISCLOSURE OF INVENTION

It is an object of the present invention to confute this assumption by showing that preliminary and/or simultaneous emission of neutrons and gamma rays is an essential condition for nuclear fusion reactions between deuterium and tritium atoms to take place. In other words, it is an object of the present invention to show that the deuterium/tritium nuclear fusion phenomenon is invariably preceded and/or accompanied by the deuterium/deuterium nuclear fusion phenomenon.

According to the present invention, there is provided a method of producing energy by nuclear fusion reactions, and comprising the steps of:

feeding a flux of positive deuterium ions to a reaction chamber containing a target having deuterium atoms in its crystal lattice and active metal elements; and conveying, inside the reaction chamber, said flux of positive deuterium ions towards the target, so that the flux of positive deuterium ions strikes the target to produce nuclear fusion reactions between the incident positive deuterium ions and some of the atoms constituting the target itself.

The present invention also relates to a machine for producing energy by nuclear fusion reactions.

According to the present invention, there is provided a machine for producing energy by nuclear fusion reactions, characterized by comprising a reaction chamber; a target housed inside said reaction chamber; a positive deuterium ion source communicating with said reaction chamber; and a pumping assembly communicating with said reaction chamber to maintain a vacuum inside the reaction chamber; said target having deuterium atoms in is crystal lattice; and said positive deuterium ion source feeding a flux of positive deuterium ions into the reaction chamber, so that said flux of positive deuterium ions strikes all the elements of the target to produce low-temperature nuclear fusion reactions between the incident positive deuterium ions and the atoms constituting the target itself.

BRIEF DESCRIPTION OF DRAWINGS

A non-limiting embodiment of the present invention will be described by way of example with reference to the accompanying drawings, in which.

BEST MODE FOR CARRYING OUT THE INVENTION

Figure 1:
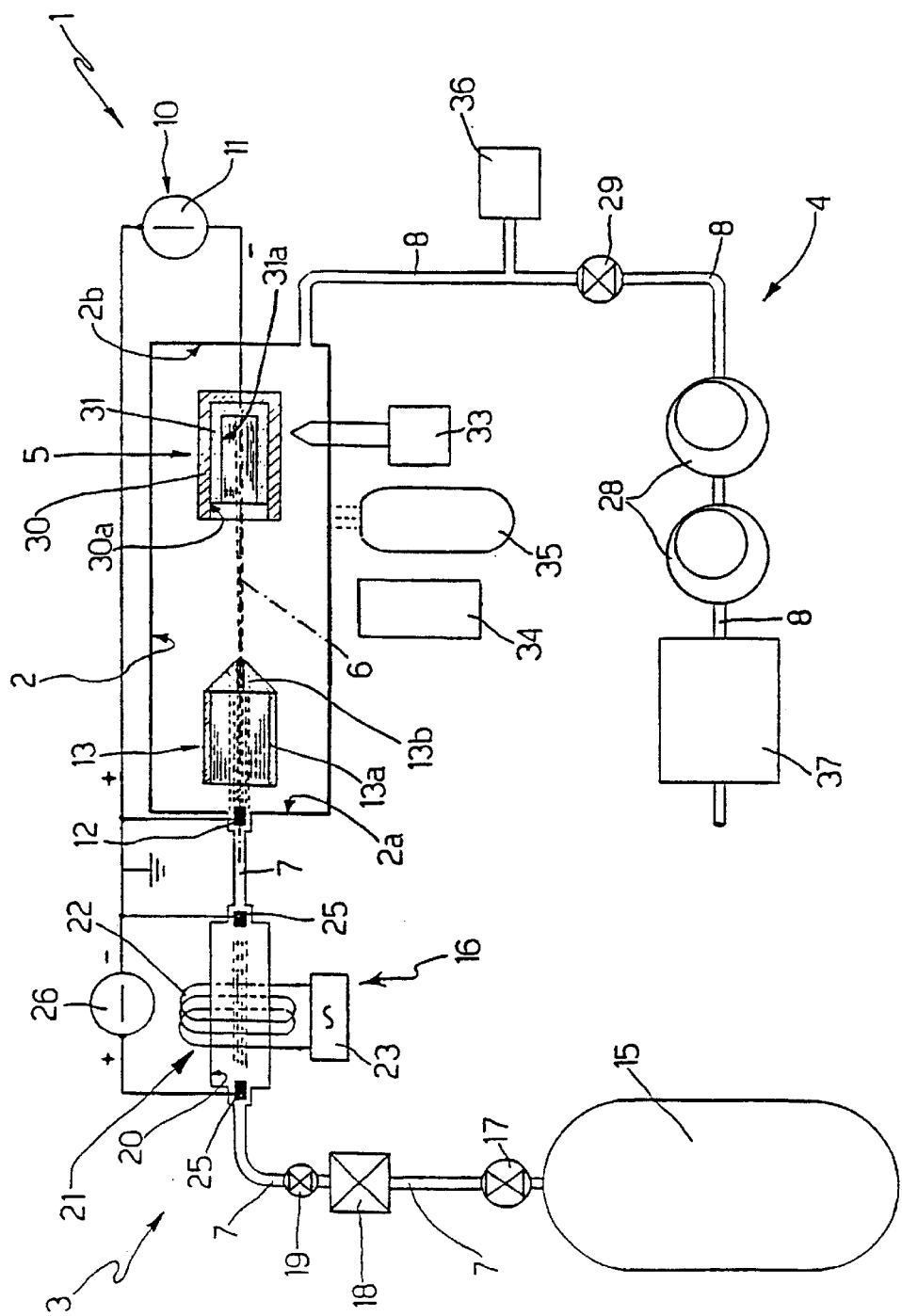
FIG. 1 shows a schematic view of a machine for producing energy by nuclear fusion reactions in accordance with the teachings of the present invention.

Number 1 in FIG. 1 indicates as a whole a machine for producing energy by low-temperature nuclear fusion reactions, as distinct from hypothetical "thermonuclear" reactions.

Machine 1 comprises a reaction chamber 2; a positive deuterium ion source 3 for feeding a flux of positive deuterium ions (deuterons) into reaction chamber 2; a known pumping assembly 4 for maintaining a relatively low pressure inside reaction chamber 2; and a target 5 housed inside reaction chamber 2, and which is struck by the flux of positive deuterium ions fed into reaction chamber 2 by source 3.

Reaction chamber 2 is preferably, but not necessarily, cylindrical, extends coaxially with a reference axis 6, and communicates with positive ion source 3 and pumping assembly 4 via respective connecting conduits 7 and 8, each of which is connected to reaction chamber 2 at a respective end 2a, 2b of reaction chamber 2. In particular, conduit 7 connecting reaction chamber 2 to source 3 is so connected to end 2a of reaction chamber 2 that said positive deuterium ions are fed into reaction chamber 2.

With reference to FIG. 1, reaction chamber 2 is connected to an ion accelerating device 10 for generating an electric field inside reaction chamber 2 to accelerate the flux of positive ions towards target 5. Accelerating device 10 comprises a pair of electrodes located at the two ends 2a, 2b of reaction chamber 2; and an electric energy source 11 for maintaining a given difference in electric potential between the two electrodes. One of the electrodes, indicated 12, is located at one end of and penetrates chamber 2, and the other electrode is defined by target 5, which is housed inside reaction chamber 2, close to end 2b of reaction chamber 2.

In the example shown, reaction chamber 2 is made of Pirex® glass, and houses a focusing device 13 close to target 5. Focusing device 13 is made of metal material, is insulated electrically from electrode 12 and target 5, and provides for concentrating the flux of positive deuterium ions on target 5. More specifically, focusing device 13 is divided into two portions 13a and 13b, the first of which faces electrode 12 and is defined by a cylindrical tubular body extending coaxially with reference axis 6, and the second of which faces target 5 and is defined by an ogival body coaxial with reference axis 6 and having a through hole with an inside diameter much smaller than the inside diameter of the cylindrical tubular body defining portion 13a.

In the example shown, source 3 of positive deuterium ions—hereinafter also referred to as "deuterons"—comprises a known tank 15 for storing gaseous deuterium, and which communicates with reaction chamber 2 via conduit 7; and a known ionizing unit 16 for ionizing the deuterium from tank 15 to form the flux of positive deuterium ions to be fed into reaction chamber 2.

Positive deuterium ion source 3 also comprises, in sequence, a known on-off valve 17 located along conduit 7 to permit and cut off supply of gaseous deuterium from tank 15; a known pressure reducing device 18; and a known mini on-off and regulating valve 19. Reducing device 18 provides for maintaining a given pressure of the gaseous deuterium from tank 15.

More specifically, ionizing unit 16 comprises a substantially cylindrical ionizing chamber 20 located along conduit 7; and a device 21 for generating high-frequency electric oscillations, and in turn comprising a coil 22 of electrically conducting material wound about ionizing chamber 20, and a power supply 23 for inducing a high-frequency electric current is coil 22 to generate inside ionizing chamber 20 an electromagnetic field capable of ionizing the gaseous deuterium from tank 15.

Ionizing unit 16 also comprises an ion accelerating device for generating an electric field inside ionizing chamber 20 to convey the flux of positive ions generated inside ionizing chamber 20 to the portion of conduit 7 communicating with reaction chamber 2. The accelerating device comprises a pair of electrodes 25 located at the two opposite ends of ionizing chamber connected to conduit 7; and a source 26 of medium-voltage electric energy, for maintaining a given adjustable difference in electric potential between the two electrodes 25.

In the example shown, electrode 12 is connected electrically to the electrode 25 located at the inlet of the portion of conduit 7 connecting ionizing chamber 20 to reaction chamber 2.

Pumping assembly 4 is defined by a pair of known vacuum pumps 28 (one rotary and one diffusion pump) connected to reaction chamber 2 by conduit 8 via the interposition of a known on-off valve 29 for selectively isolating reaction chamber 2 from pumping assembly 4.

Figure 2:
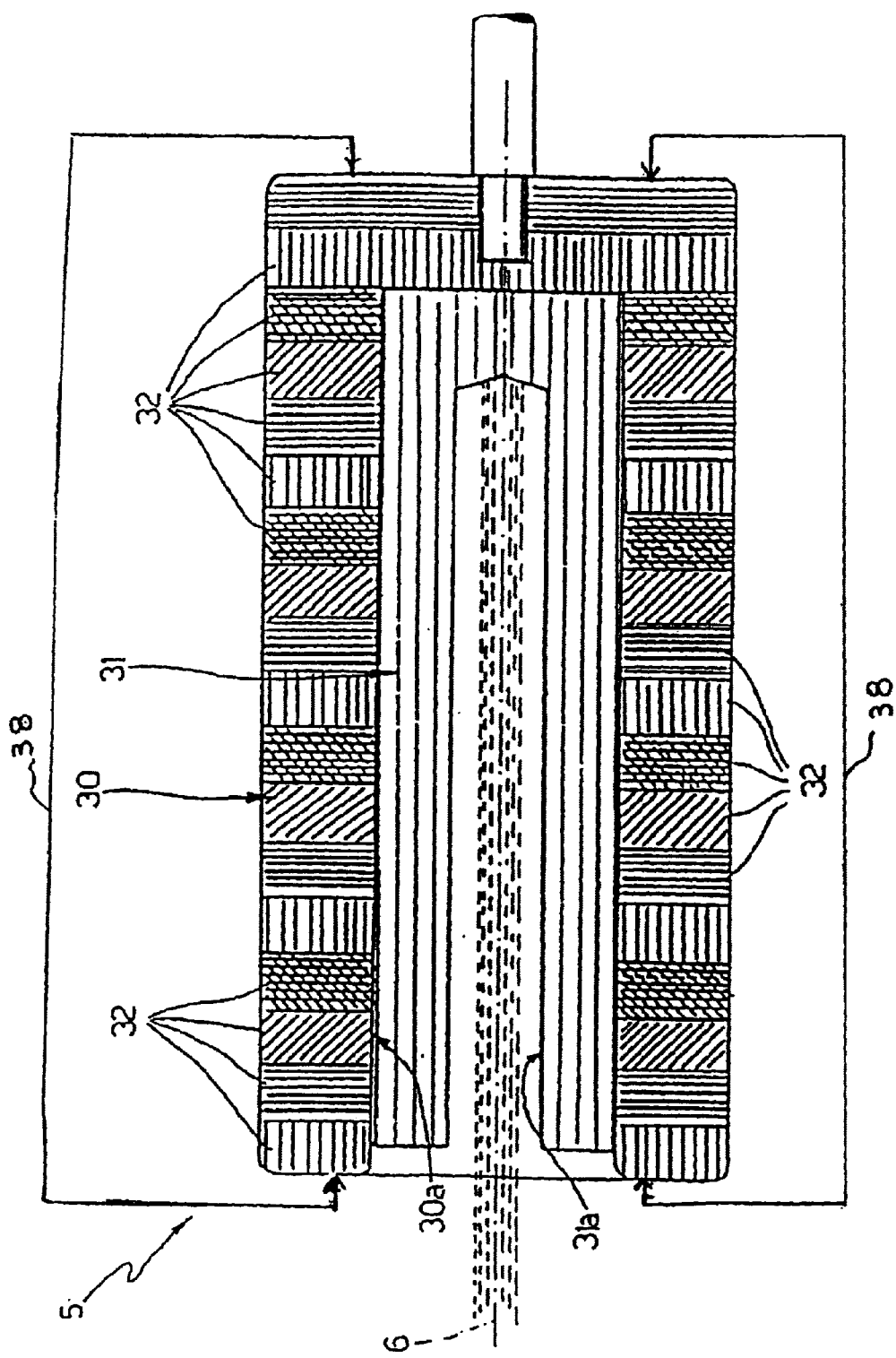
FIG. 2 shows a section of a detail of the FIG. 1 machine.

With reference to FIGS. 1 and 2, target 5 comprises a preferably, but not necessarily, cylindrical outer casing 30, which is substantially cup-shaped and coaxial with axis 6 with its cavity 30a facing focusing device 13; and a substantially cup-shaped active element 31 housing inside casing 30 with its cavity 31a coaxial with axis 6 and facing focusing device 13.

In the example shown, casing 30 is itself also an active element, and is defined by a stack of alternating washers 32 of different metals (e.g. copper, titanium, iron, nickel and/or other metals of similar chemical-physical characteristics) held together by gripping elements 38 (shown schematically) such as longitudinal screw ties.

Active element 31 is defined by a compact aggregate of metal salts, in turn defined by a number of powdered metal sulfates (e.g. copper sulfate, lithium sulfate, titanium sulfate, potassium sulfate, etc.) mixed together with the addition of catalyzing and/or binding elements to improve the compactness of the aggregate. The copper and lithium sulfates are hydrated with heavy water ($D_2O$).

Each metal salt hydrated with heavy water ($D_2O$) is obtained from a corresponding metal salt hydrated with water ($H_2O$), e.g. $CuSO_4 \cdot 5H_2O$, which is first placed in an oven at a temperature of about 250° C. until all the water ($H_2O$) molecules are eliminated, and is then placed in a silica gel dryer (known type) in which the salt is recrystallized in the pressure of heavy water ($D_2O$) to obtain a corresponding metal salt hydrated with heavy water ($D_2O$), e.g., $CuSO_4 \cdot 4D_2O$.

Titanium sulfate is preferably, but not necessarily, used as a catalyzing element, and a silicone resin or alkaline alkylsiliconate dissolved in heavy water ($D_2O$) is preferably, but not necessarily, used as a binding element.

A first possible composition of active element 31 includes:

0.278 moles of $CuSO_4 \cdot 4D_2O$;
1.853 moles of $LiSO_4 \cdot 0.8D_2O$;
0.0625 moles of $TiOSO_4$; and
q.s. of a 5% ethereal solution of an alkylpolysiloxane resin with a R/Si ratio of about 1.5 to obtain a thick homogeneous mixture, which is then dried in a mold at a given temperature (about 40° C.).

A second possible composition of active element 31 includes:

0.125 moles of $NiSO_4 \cdot 5.6D_2O$;
0.278 moles of $CuSO_4 \cdot 4D_2O$;
1.853 moles of $Li_2SO_4 \cdot 0.8D_2O$;
0.172 moles of $K_2SO_4$; and
q.s. of a 5% ethereal solution of an alkylpolysiloxane resin with a R/Si ratio of about 1.5 to obtain a thick homogeneous mixture, which is then dried in a mold at a given temperature (about 40° C.).

A third possible composition of active element 31 includes:

0.278 moles of $CuSO_4 \cdot 4D_2O$;
1.853 moles of $Li_2 \cdot 0.8D_2O$;
0.172 moles of $K_2SO_4$;
0.125 moles of $TiOSO_4$; and
q.s. of a 5% ethereal solution of an alkylpolysiloxane resin with a R/Si ratio of about 1.5 to obtain a thick homogeneous mixture, which is then dried in a mold at a given temperature (about 40° C.).

The quantity of heavy water ($D_2O$) to recrystallized metal salts $CuSO_4$, $Li_2SO_4$ and $NiSO_4$ is 20% less than the stoichiometrically calculated quantity, to reduce the activation time of target 5.

With reference to FIG. 1, machine 1 also comprises a device 33 (e.g. a thermocouple) for measuring the temperature of target 5, a device 34 for detecting and counting the neutrons emitted, and a device 35 for measuring gamma ray emissions, all of which are located close to reaction chamber 2; a device 36 for measuring the pressure inside reaction chamber 2, and which is branch connected to conduit 8 between reaction chamber 2 and valve 29; and a device 37 for detecting the presence of tritium in reaction chamber 2, and which is located along conduit 8 downstream from pumping assembly 4.

Devices 33, 34, 35, 36, 37 are all known types and therefore require no description.

Operation of machine 1 will now be described assuming pumps 28 of pumping assembly 4 have already brought the pressure inside reaction chamber 2 to extremely low values (a few thousandths of a mm of Hg).

In actual use, when valve 17 is opened, the gaseous deuterium flows into conduit 7 and through pressure reducing device 18 into ionizing unit 16, where it is ionized to supply reaction chamber 2 with a flux of deuterons. More specifically, the gaseous deuterium is ionized by electromagnetic excitation by the high-frequency magnetic field produced by device 21, and is conveyed towards reaction chamber 2 by the electric field generated by the two electrodes 25, between which a difference in electric potential of a few kilovolts is maintained.

Figure 3:
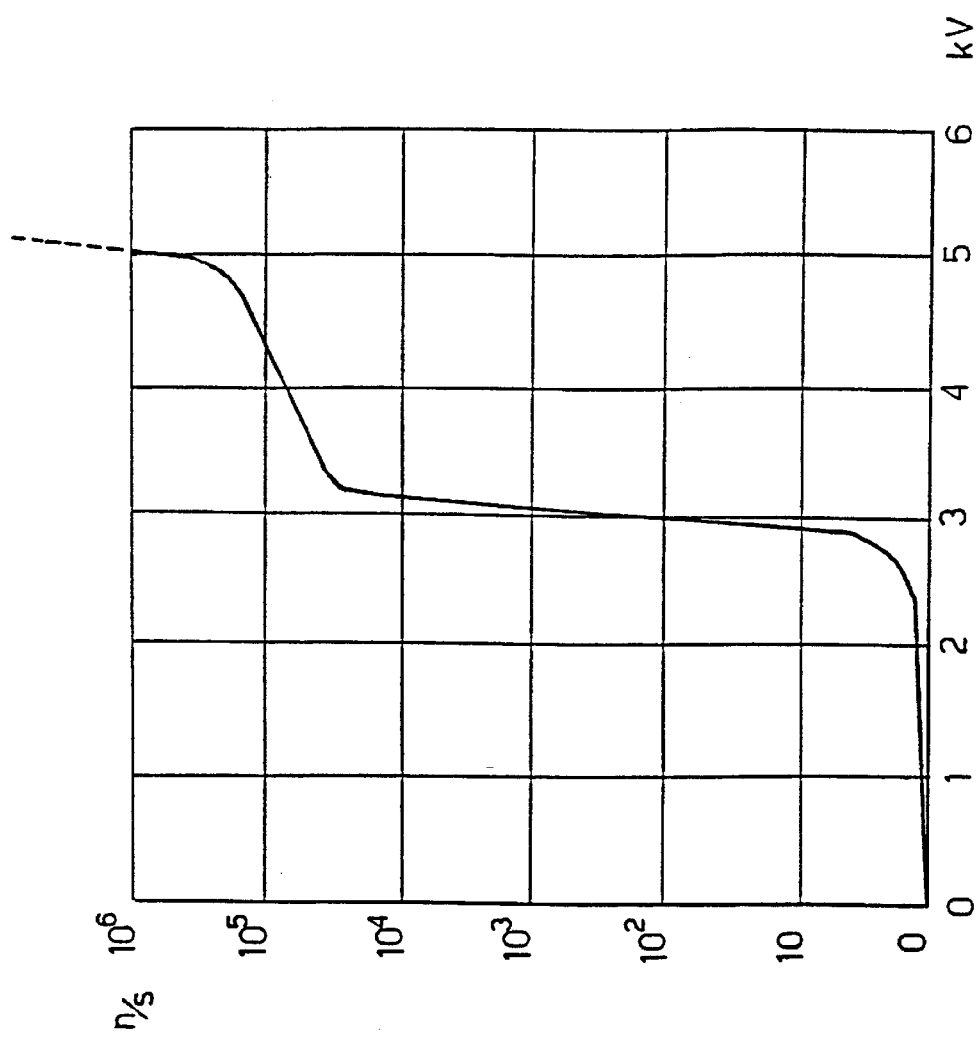
FIG. 3 shows a graph illustrating the production of neutrons.

At the same time, source 11 maintains a difference in electric potential of preferably, but not necessarily, 2 to 10 kilovolts between electrode 12 and target 5, so that the deuterons, once inside reaction chamber 2, are conveyed towards target 5 by the electric field in reaction chamber 2, to bombard target 5 as shown in the FIG. 3 graph, which shows the production of neutrons per second as a function of the acceleration voltage applied.

Prior to bombarding target 5, the flux of deuterons is fed through focusing device 13, by which it is concentrated into a narrow deuteron beam suitable for striking active element 31.

Upon the deuteron beam striking active element 31, device 33 detects a fall in the temperature of target 5, and device 36 a fall in the pressure inside reaction chamber 2; which phenomena may be explained by absorption of the incident deuterons into active element 31, and by subsequent catalytic disintegration of the deuterons inside the crystal lattice of active element 31 according to endothermic nuclear reaction:

$$D \xrightarrow{Metal} n + p(-2.224 \text{ MeV})$$

where "D" indicates a deuterium atom, "n" a neutron, and "p" a proton.

Subsequently, device 33 detects a sharp increase in the temperature of target 5 (to about 1000° C.), while devices 34, 35, 37 respectively detect a neutron flux (up to $10^5$ neutrons per second) several magnitude order (from 3 to 5) greater than the natural flux, a high emission of electromagnetic waves of various wavelengths including gamma and x-rays, and the production of tritium; which phenomena may be explained by the initiation of low-temperature nuclear fusion reactions according to the following exothermic reactions:

$$D+D \rightarrow T+p+\gamma(+4.015 \text{ MeV}) \qquad \text{I)}$$

$$D+D \rightarrow {}^3He+n+\gamma(+3.250 \text{ MeV}) \qquad \text{II)}$$

where "D" indicates a deuterium atom, "T" a tritium atom, "$^3$He" a helium-3 atom, "n" a neutron, "p" a proton, and "γ" the emission of gamma rays.

More specifically, exothermic reaction (I) may be the result of the following sum of reactions:

$$\begin{array}{l} D \xrightarrow{Metal} n + p(-2.224 \text{ MeV}) + \\ \underline{D + n \rightarrow T + \gamma(+6.239 \text{ MeV})} = \\ D + D \rightarrow T + p + \gamma(+4.015 \text{ MeV}) \end{array};$$

and exothermic reaction (II) the result of the following sum of reactions:

$$\begin{array}{l} D \xrightarrow{Metal} n + p(-2.224 \text{ MeV}) + \\ \underline{D + n \rightarrow {}^3He + \gamma(+5.474 \text{ MeV})} = \\ D + D \rightarrow {}^3He + n + \gamma(+3.250 \text{ MeV}) \end{array}.$$

As exothermic reaction (I) involves the production of tritium, a further low-temperature nuclear fusion reaction may be initiated according to the following exothermic reaction:

$$D+T \rightarrow {}^4He+n \ (+17.6 \text{ MeV}), \qquad \text{III)}$$

where "D" indicates a deuterium atom, "T" a tritium atom, "$^{.43}$He" a helium-4 atom, and "n" a neutron.

In view of the large amount of energy produced, exothermic reaction (III) may account for the sharp increase in the temperature of target 5 (during experiments, target 5 reached temperatures of around 1000° C.).

Given the heterogeneous composition of active element 31, other low-temperature nuclear fusion reactions may also take place, such as:

Deuterium+Deuterium→Helium-4
Deuterium+proton→Helium-3+gamma photon
Deuterium+neutron→Tritium+gamma photon
Lithium-6+neutron→Tritium+Helium-4
Lithium-7+neutron→Tritium+Helium-4+neutron
Lithium-7+proton→Beryllium+gamma photon
Copper+gamma photon→Radioactive copper+neutron
Titanium+neutron→Radioactive titanium+gamma photon
Potassium+neutron→Radioactive potassium+2 neutrons
Beryllium-9+proton→Beryllium-8+deuteron During operation, experiments showed that a reduction in the electric potential difference between electrode 12 and target 5 immediately following the rapid increase in temperature, assimilable with commencement of the nuclear fusion reactions, does not result in a proportional reduction in neutron flux (a reduction in potential from 5 to 3 kilovolts resulted in a roughly 25% reduction in the number of neutrons emitted per unit time).

The method according to the present invention therefore comprises feeding a flux of positive deuterium ions to a reaction chamber 2 housing a target 5 having deuterium atoms in its crystal lattice. Subsequently, the method provides for conveying the flux of positive deuterium ions entering reaction chamber 2 towards target 5, so that the flux of positive deuterium ions strikes target 5 to produce nuclear fusion reactions between the incident positive deuterium ions and some of the atoms constituting target 5.

More specifically, the step of conveying the positive deuterium ions towards target 5 comprises accelerating the flux of positive deuterium ions by means of an electric field, and focusing the flux of positive deuterium ions into a concentrated beam prior to impact with target 5.

In the example shown, the step of feeding the flux of positive deuterium ions to reaction chamber 2 comprises drawing deuterium atoms in gaseous form from tank 15, and subsequently ionizing the deuterium atoms to produce the flux of positive deuterium ions for supply to reaction chamber 2.

Clearly, changes may be made to the method and machine 1 as described and illustrated herein without, however, departing from the scope of the present invention.

What is claimed is:

1. A machine (1) for producing energy by nuclear fusion reactions, characterized by comprising a reaction chamber (2); a target (5) housed inside said reaction chamber (2); a positive deuterium ion source (3) communicating with said reaction chamber (2); and a pumping assembly (4) communicating with said reaction chamber (2) to maintain a vacuum inside the reaction chamber (2); said target (5) comprising an active element (31) made of a material having a crystal lattice and deuterium atoms in its crystal lattice; and said positive deuterium ion source (3) feeding a flux of positive deuterium ions into the reaction chamber (2), so that said flux of positive deuterium ions strikes said active element (31) of the target (5) to produce nuclear fusion reactions between the incident positive deuterium ions and the atoms constituting the target (5) itself, said target (5) comprising an outer casing (30), which is substantially cup-shaped with a cavity (30a) facing said focusing device (13); said active element (31) being housed inside said outer casing (30) and being substantially cup-shaped with a cavity (31a) facing a focusing device (13); said active element (31) being struck by a concentrated beam of positive deuterium ions.

2. A machine as claimed in claim 1, characterized in that said reaction chamber (2) comprises accelerating means (10) for conveying said flux of positive deuterium ions against said target (5) and accelerating the positive deuterium ions.

3. A machine as claimed in claim 2, characterized in that said accelerating means (10) comprise at least two electrodes (5, 12) housed inside the reaction chamber (2); and an electric energy source (11) for maintaining an in any way variable difference in electric potential between the two electrodes (5, 12); one of said two electrodes (5, 12) being defined by said target (5).

4. A machine as claimed in claim 1 characterized in that said reaction chamber (2) comprises a focusing device (13) through which said flux of positive deuterium ions travels prior to striking said target (5); said focusing device (13) focusing said flux of positive deuterium ions to form a concentrated beam of positive deuterium ions.

5. A machine as claimed in claim 1, characterized in that said outer casing (30) is made of metal material.

6. A machine as claimed in claim 5, characterized in that said outer casing (30) is defined by a stack of alternating washers (32) made of different metal materials and held together by gripping means.

7. A machine as claimed in claim 1, characterized in that said active element (31) is defined by an aggregate comprising metal salts.

8. A machine as claimed in claim 7, characterized in that some of the metal salts belong to the class of sulfates comprising ferrous sulfate, nickel sulfate, titanium sulfate and potassium sulfate.

9. A machine as claimed in claim 7, characterized in that the metal salts are selected from copper sulfate and lithium sulfate; said sulfate being hydrated with heavy water.

10. A machine as claimed in claim 1, characterized in that said material of said active element (31) is capable, when stricken by a deuterium ion flux, of absorbing positive deuterium ions and starting an endothermic reaction with said positive deuterium ions.

11. A machine as claimed in claim 1, characterized in that said positive deuterium ion source (3) comprises a tank (15) containing deuterium atoms in gaseous form for supply to said reaction chamber (2); and an ionizing unit (16) interposed between said tank (15) and said reaction chamber (2) to so ionize the deuterium atoms as to supply said reaction chamber (2) with a flux of positive deuterium ions.

* * * * *